(No Model.)
T. P. WATKINS.
WHISK BROOM HANDLE.
No. 304,589. Patented Sept. 2, 1884.
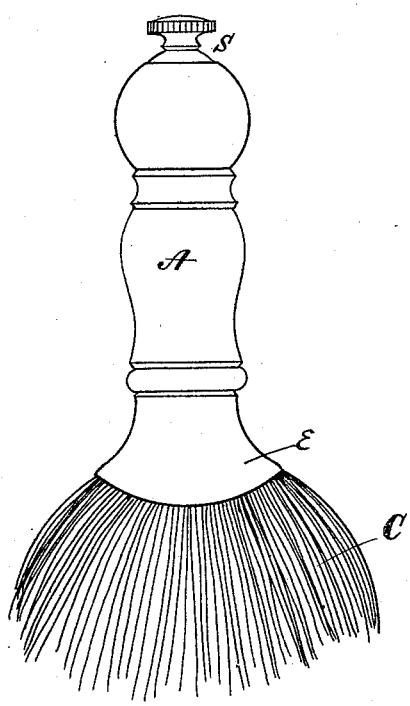
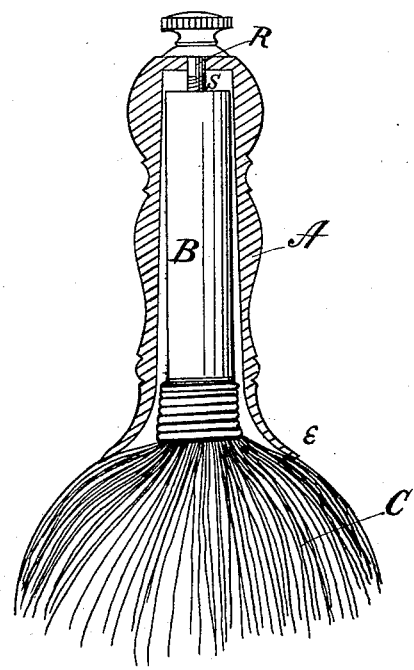
Witnesses
A. C. Fuller
Fred. A. Mason
Inventor
Thomas P. Watkins
by R. W. Mason Atty.

UNITED STATES PATENT OFFICE.

THOMAS P. WATKINS, OF NEW BEDFORD, MASSACHUSETTS.

WHISK-BROOM HANDLE.

SPECIFICATION forming part of Letters Patent No. 304,589, dated September 2, 1884.

Application filed January 4, 1884. (No model.)

*To all whom it may concern:*

Be it known that I, THOMAS P. WATKINS, a citizen of the United States, residing at New Bedford, in the county of Bristol and State of Massachusetts, have invented a new and useful Improvement in Whisk-Broom Handles, of which the following is a specification.

My invention relates to whisk-brooms, and has for its object to produce a highly ornamental and durable handle, which may be removed from a broom when the broom is worn out and applied to a new broom without trouble. I attain this object by the device illustrated in the accompanying drawings, in which—

Figure 1 is a view of a whisk-broom with my improved ornamental handle attached. Fig. 2 shows a longitudinal section of the ornamental handle, and showing the means of attaching it to the broom.

In Fig. 2, C represents a whisk-broom, and B the stock to the same. A is the ornamental handle, and S the screw by means of which the ornamental handle A is made fast to the stock B. The handle A is made flaring at $e$, so as to fit around the shoulders and sides of the broom, and thereby give it a broad and firm bearing. Through the top of the handle A is made a perforation, through which passes the screw S, which screw serves to secure the handle A to the broom. When the screw S is tightened up sufficiently, the flaring portion $e$ of the handle presses firmly against the shoulders and sides of the broom, and the handle A becomes as firm and solid as if it were a part of the broom itself. In order to remove the handle A from one broom to another, it is only necessary to remove the screw S, when the handle can be removed and attached without trouble.

The handle A may be made of metal cast in one entire piece; but I prefer to mold it from celluloid or other analogous material, and the opening in the handle is made large enough to take any ordinary-sized stock of a whisk-broom, as it is not necessary that the handle should closely embrace the broom-stock, depending, as it does, on the bearing of the flaring end $e$ and the screw S for its firmness and solidity. I am aware that ornamental handles have heretofore been applied to whisk-brooms; but, as far as my knowledge extends, none of them have been designed to be transferred from one broom to another when one broom has been worn out.

It will be observed that the present invention shows an ornamental handle for a whisk-broom constructed of one entire piece of material with a flaring opening, so as to fit around the shoulders and sides of the broom, and depends for its solidity upon the broad bearing of the flaring end and the screw in the end of the handle which holds it on the broom.

Having thus described my invention, what I claim, and desire to secure by Letters Patent, is—

1. A replaceable handle for a broom, consisting of a hollow or tubular handle made flaring at its lower or open end to fit over the curved sides of the broom, and provided at its upper end with a set-screw seated therein and passing therethrough into the ordinary stock or handle of the broom, whereby the replaceable handle is pressed upon the broom and secured thereto, substantially as described.

2. The combination, with a broom and its stock, of a replaceable tubular handle fitting over the broom-stock, and having a flaring end bearing against the sides of the broom, and a screw passing through the end of the handle and engaging with the stock to bind the stock and handle together and press the flaring end of the latter against the sides of the broom, substantially as and for the purpose set forth.

THOS. P. WATKINS.

Witnesses:
F. JENNEY,
FRED A. MASON.